(12) United States Patent
Mishra et al.

(10) Patent No.: US 11,594,225 B2
(45) Date of Patent: Feb. 28, 2023

(54) SMART INTERACTIVE MEDIA CONTENT GUIDE

(71) Applicant: AT&T INTELLECTUAL PROPERTY I, L.P., Atlanta, GA (US)

(72) Inventors: Taniya Mishra, New York, NY (US); Dimitrios Dimitriadis, Rutherford, NJ (US); Diane Kearns, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 68 days.

(21) Appl. No.: 16/107,196

(22) Filed: Aug. 21, 2018

(65) Prior Publication Data

US 2018/0358017 A1 Dec. 13, 2018

Related U.S. Application Data

(63) Continuation of application No. 14/267,540, filed on May 1, 2014, now Pat. No. 10,089,985.

(51) Int. Cl.
*G10L 15/26* (2006.01)
*H04N 21/482* (2011.01)
(Continued)

(52) U.S. Cl.
CPC ....... *G10L 15/26* (2013.01); *H04N 21/41265* (2020.08); *H04N 21/41407* (2013.01);
(Continued)

(58) Field of Classification Search
CPC ......... H04N 21/4126; H04N 21/41407; H04N 21/472
(Continued)

(56) References Cited

U.S. PATENT DOCUMENTS 7,055,168 B1 * 5/2006 Errico ................. G11B 27/105
725/46
7,174,295 B1 * 2/2007 Kivimaki ............... G06F 3/167
704/260
(Continued)

FOREIGN PATENT DOCUMENTS

CN 2681491 2/2005
CN 1893593 1/2007
(Continued)

OTHER PUBLICATIONS

AT&T U-verse* Starter Guide, "Easy steps for getting the most from your AT&T U-verse TV, High Speed Internet, and Voice services", (downloaded on Jun. 22, 2014).

*Primary Examiner* — Nasser M Goodarzi
*Assistant Examiner* — Jaycee Imperial
(74) *Attorney, Agent, or Firm* — Guntin & Gust, PLC; Ralph Trementozzi

(57) ABSTRACT

Methods, apparatuses and media for providing content upon request are provided. A search request for content is received from a user. A first filter is applied to the search request to modify the search request before a search algorithm searches for the content to return in response to the search request. Items of content are determined based on the search request to which the first filter is applied. A second filter is applied to the items of content to determine search results. The search results are provided to the user.

20 Claims, 11 Drawing Sheets

(51) Int. Cl.
*H04N 21/414* (2011.01)
*H04N 21/81* (2011.01)
*H04N 21/472* (2011.01)
*H04N 21/41* (2011.01)
*G10L 13/00* (2006.01)

(52) U.S. Cl.
CPC ..... *H04N 21/472* (2013.01); *H04N 21/47202* (2013.01); *H04N 21/482* (2013.01); *H04N 21/4825* (2013.01); *H04N 21/4828* (2013.01); *H04N 21/8173* (2013.01); *H04N 21/8186* (2013.01); *G10L 13/00* (2013.01)

(58) Field of Classification Search
USPC .......................................................... 725/53
See application file for complete search history.

(56) References Cited

U.S. PATENT DOCUMENTS

| | | | |
|---|---|---|---|
| 8,000,972 | B2 | 8/2011 | Candelore |
| 8,079,044 | B1 * | 12/2011 | Craner ............... H04N 21/4826 725/28 |
| 8,175,885 | B2 | 5/2012 | Sureka et al. |
| 8,320,901 | B2 | 11/2012 | Klein et al. |
| 8,421,932 | B2 | 4/2013 | Ouchi et al. |
| 8,522,283 | B2 | 8/2013 | Lagiland et al. |
| 8,719,383 | B2 | 5/2014 | Chakraborty et al. |
| 8,863,191 | B2 | 10/2014 | Choi et al. |
| 9,734,460 | B1 * | 8/2017 | Venkataraman ....... G06Q 10/00 |
| 2003/0229900 | A1 * | 12/2003 | Reisman ............... G06F 16/954 725/87 |
| 2005/0049862 | A1 * | 3/2005 | Choi ....................... G10L 15/26 704/231 |
| 2006/0075429 | A1 | 4/2006 | Istvan et al. |
| 2010/0153999 | A1 | 6/2010 | Yates |
| 2010/0192181 | A1 * | 7/2010 | Friedman ............. H04N 5/4403 725/44 |
| 2011/0047474 | A1 * | 2/2011 | Sung .................. H04M 1/72533 715/740 |
| 2011/0067059 | A1 | 3/2011 | Johnston et al. |
| 2011/0078720 | A1 | 3/2011 | Blanchard et al. |
| 2012/0089996 | A1 * | 4/2012 | Ramer .................... H04H 60/46 725/14 |
| 2012/0150632 | A1 | 6/2012 | Fan et al. |
| 2012/0311639 | A1 | 12/2012 | Hill et al. |
| 2013/0040629 | A1 * | 2/2013 | Sprigg ............... H04N 21/6543 455/419 |
| 2013/0174273 | A1 * | 7/2013 | Grab ........................ G06F 21/00 726/28 |
| 2013/0212616 | A1 | 8/2013 | Goswitz et al. |
| 2013/0291019 | A1 * | 10/2013 | Burkitt ............... H04N 21/4828 725/53 |
| 2013/0339991 | A1 | 12/2013 | Ricci |
| 2014/0122059 | A1 | 5/2014 | Patel et al. |
| 2014/0143809 | A1 | 5/2014 | Sung et al. |
| 2014/0188925 | A1 * | 7/2014 | Skolicki ............. H04N 21/4622 707/765 |
| 2014/0196092 | A1 * | 7/2014 | Chung .................... G10L 15/26 725/53 |
| 2014/0282633 | A1 | 9/2014 | Fiero |
| 2015/0100983 | A1 | 4/2015 | Pan |
| 2016/0188658 | A1 * | 6/2016 | Thomson ............... G06Q 30/02 707/766 |

FOREIGN PATENT DOCUMENTS

| | | | |
|---|---|---|---|
| CN | 202374354 | | 8/2012 |
| KR | 10-2013-0137316 | | 12/2013 |
| WO | WO-2012162597 | A1 * | 11/2012 ............ G06Q 30/02 |

\* cited by examiner

SMART INTERACTIVE MEDIA CONTENT GUIDE

CROSS REFERENCE TO RELATED APPLICATIONS

The present application is a continuation application of U.S. patent application Ser. No. 14/267,540, filed on May 1, 2014. The disclosure of this document, including the specification, drawings, and claims, is incorporated herein by reference in its entirety.

BACKGROUND

1. Field of the Disclosure

The present disclosure relates to the field of media content guides. More particularly, the present disclosure relates to providing a smart interactive media content guide that assists users in finding media content.

2. Background Information

Service providers provide television content to viewers. Service providers may also provide electronic media content guides so that viewers can search for available television content to watch. Available television content may include listed broadcast content, on-demand content only provided on demand, and recorded content that is stored locally on customer premise equipment. The media content guides may be navigable so that a viewer can navigate between pages such as a main page and different pages for each different type of available television content. Available television content may be listed by title, genre, broadcast channel, broadcast time and length. Additional information about an individual item of available television content may be provided if a viewer selects the individual item from a list.

When searching a media content guide, a viewer punches buttons on, for example, a remote control, and views information on a television screen. The remote control may be used to control service provider equipment such as a set-top box or viewer equipment such as a television or an audio/visual receiver. As an example, the viewer may enter free-form searches by punching number buttons and letter buttons. A viewer may also punch a "GUIDE" button, a "DVR" button or a "MENU" button on a remote control to display an initial media content guide page on a television screen. The viewer may then punch a directional arrow button and an "ENTER" or "SELECT" button to manipulate a cursor on the television screen and scroll between pages or through a page that includes listed media content.

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
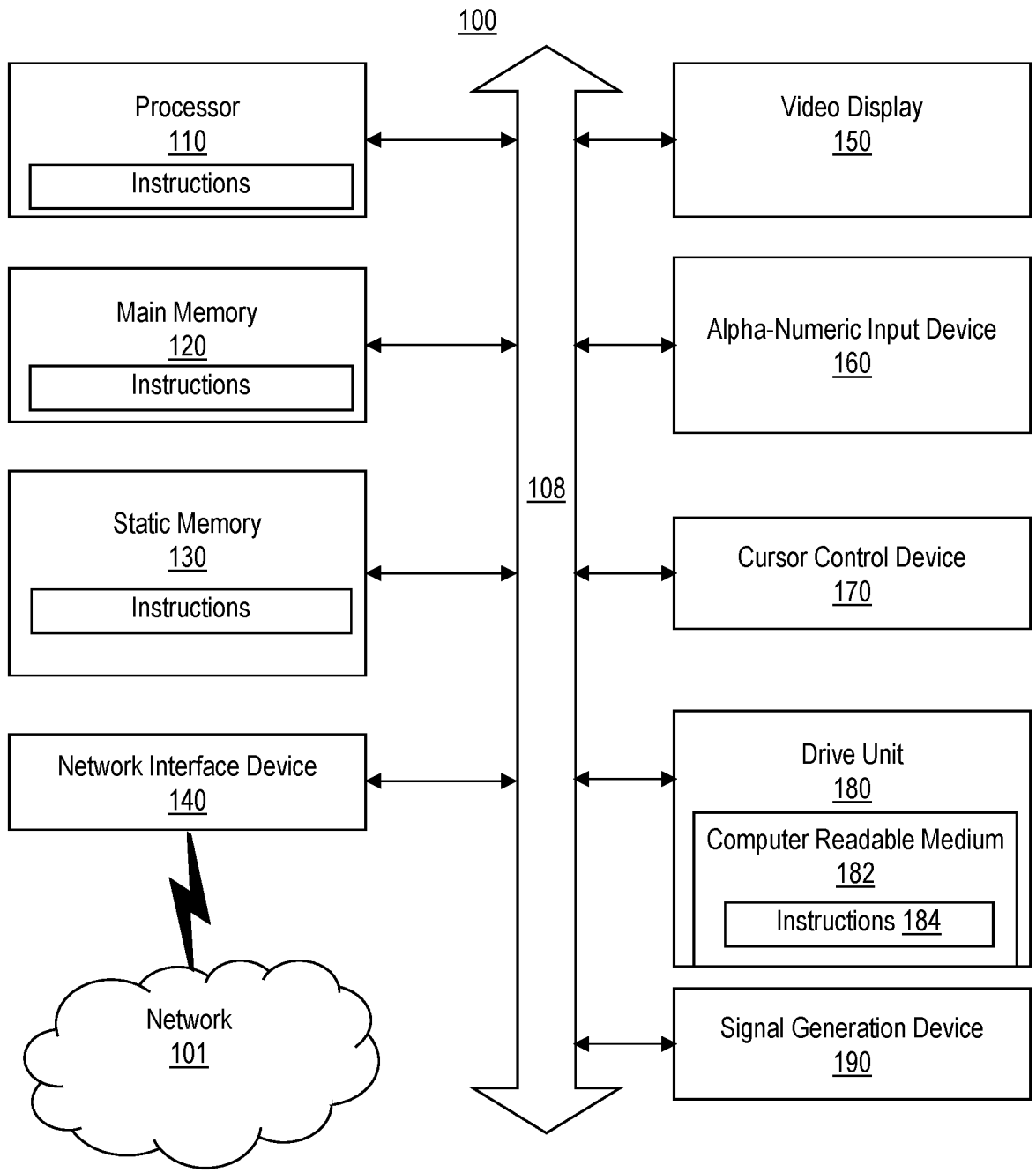
FIG. 1 shows an exemplary general computer system that includes a set of instructions for providing a smart interactive media content guide.

FIG. 1 is an illustrative embodiment of a general computer system, on which a smart interactive media content guide can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a tablet computer, a wireless smart phone, a dedicated smart remote control including a universal remote control, a smart television, a set-top box (STB), an audio/visual receiver, a laptop computer, a stationary computer such as personal computer (PC), a control system, a web appliance, a media server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

As described herein, a user can enter a search request for television content into a user device. The user device is provided with an executable application to help the user find appropriate television content. The examples herein mainly describe circumstances in which the application is tailored to help children find appropriate television content. In a particular example the children may be young children that, for example, can understand speech but not yet read. In such circumstances, the application is downloaded to the user device by a person who can read such as an adult. The adult inputs settings to control what content can be presented to the children and the manner in which the listings of the content can be presented.

As also described, the search request input to the application may be provided by the user audibly as speech, and the search result output of listings may be provided audibly to the user as speech. Audible input can be converted to text by the user device, by a local device proximate to the user device, or within a network of the television content service provider. The text is then analyzed to find the listings for television content to provide to the requester as search result output. The search result output may be provided in a voice selected by the adult or child.

Further, the results may be provided simultaneously both audibly and via a visual display. The text of the show descriptions can be presented visually and highlighted in synchronization with the spoken output which simultaneously describes the show audibly. For example, listings may be provided on a screen of the television, or on a screen of the user device, while also being audibly announced by the user device or by the television. The visual display of a particular listing may be highlighted as the same listing is audibly announced, to, for example, assist the child who does not yet read in recognizing the listing of interest.

The user device on which the application is installed is typically a general-purpose user device, such as a smart phone, tablet computer, or laptop computer. Once installed, the user device and application may be synced/paired with the television on which content is provided by the service provider. The user device and application may also be paired with other devices such as a set-top box or an audiovisual receiver. Thus, searches provided to the user device can be analyzed locally by the user device, by the set-top box or audiovisual receiver, or passed through to the content provider network and analyzed therein after being converted to text. When the set-top box is used to control the display of content on the television, instructions from the service provider or application provider (if different than the service provider) are provided to the set-top box rather than directly to the television.

Search results may be listings of broadcast content, on-demand content whether free or for a price, or locally stored content stored on, e.g., a digital video recorder set-top box. Listings of content that can be provided may be a guide to television programs to be broadcast, and may include show names and broadcast channels and times.

Patterns of search requests and content selections can be stored, analyzed and used to make the smart interactive media content guide smarter. For example, records of shows most often selected or never selected by a particular user or for a particular account can be identified and then used to more accurately respond to future search requests from the user or for the account. Additionally, the search request can be stored and provided as a record to a user responsible for an account by which the television content is provided as a service. Thus, for example, a parent may review a history of search requests input by their children. Therefore, patterns of search requests and selections particular to a smart interactive media content guide for children may be used both by the service provider and for the account owner responsible for the account.

Figure 2:
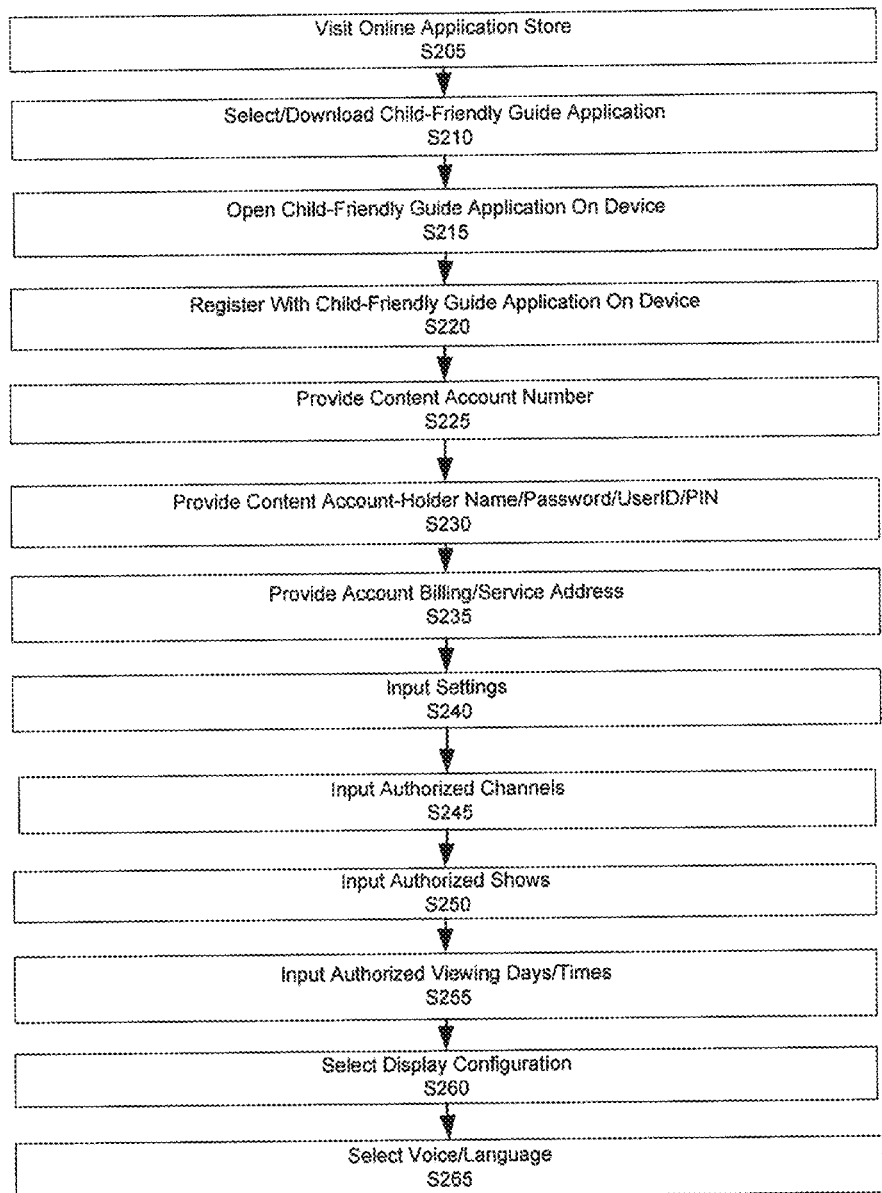
FIG. 2 shows an exemplary process for using a smart interactive media content guide, according to an aspect of the present disclosure.

FIG. 2 shows an exemplary process for using a smart interactive media content guide, according to an aspect of the present disclosure. In the process shown in FIG. 2, a viewer visits an online application store at S205. One or more online application stores may carry the smart interactive media content guide application described herein. In the Figures and description, any reference to the child-friendly guide application is to the smart interactive media content guide application. The online application stores may include stores provided by communications carriers, device providers, or other general online stores. Online application stores include Google Play and the Apple App Store. At S210, the viewer selects and downloads a child-friendly guide application. The child-friendly guide application can be downloaded to a user device, such as a smart phone, tablet computer or laptop computer. The child-friendly guide application may be provided by a service provider from which the viewer receives television content. Alternatively, the child-friendly guide application may be provided by a third party to work with equipment used to play television content provided by the service provider. An exemplary name for the smart interactive media content guide application is U-Verse Kids, so that the application can be used to provide content to children at homes provided television service by U-Verse from AT&T Corporation.

At S215, the child-friendly guide application is opened on the user device, and the user is invited to begin a registration process. At S220, the user registers with the child-friendly guide application on the user device. Registration of the child-friendly guide application can be used to associate the application with an account by which television content provided by the service provider. Use of the child-friendly guide application and information pertaining to the users of the child-friendly guide application can be stored, and used to enhance the service provided by the service provider. For example, profile information of users or classes of users can be identified based on even the initial selection and downloading of the child-friendly guide application. That is, even the selection of a dedicated "child-friendly" guide application for download by an account holder may be used to advise the content provider that the account is likely used, at least in part, by a child. This information can be used to provide particular offers of content or services to the account holders who download the child-friendly guide application and register the child-friendly guide application in association with the service.

Additionally, individual search terms and content selections over time can be analyzed to identify the likely users, in order to help, for example, ensure that children are not being provided with content that adults do not want them to be provided with. Patterns of both search and selections of content can be used to tailor future search result outputs over time, so that the searches and individual selections of content can be stored as part of a profile for an individual user of the account or for the account as a whole. For example, a child that consistently selects content from one particular show to view, even when content from multiple shows is presented, may be presented with content from the one particular show based on recognition of the pattern of selections by the user.

At S225, the user provides the content account number and/or other information for the account with the service provider from which the user receives television content. At S230, the user provides the name, password, user identification, or personal identification number associated with the account. At S235, the user provides the billing and service address associated with the account.

At S240, the user inputs general settings for the child-friendly guide application. General settings may include font size, color selections and audio volume for the output of text and sound for search results. General settings may also include information about the television by which content will be watched, to determine for example, if the television is a smart television with a processor that executes software programs. The information about the television may also identify whether the smart television is self-directed and not controlled by a set-top box, or if controlled by a set-top box, whether the set-top box is a digital video recorder.

At S245, the user inputs authorized channels. At S250, the user inputs authorized shows. At S255, the user inputs authorized viewing days and times. At S260, the user selects a display configuration for the child-friendly guide application. At S265, the user selects a voice and language for the child-friendly guide application. Thus, the child friendly guide application can be configured by the account owner to filter information that parents do and do not want kids to view. As an example, among the settings set by the user, the user may be able also be specify shows, channels and genres that the parent specifically does not want returned as selectable search results by the child-friendly guide application, as well as shows, channels and genres that the parent specifically does want returned as selectable search results. It should be noted that this filtering of information about content may be provided separately from the filtering of the content itself. Thus, the child-friendly search application in FIG. 2 may work separately, but in conjunction with, other adult-supervision functions that when configured, prevent viewing of particular shows and channels.

The process of FIG. 2 involves, for example, a parent. The parent downloads the child-friendly guide application for a child and then configures the child-friendly guide application for use by the child. The selections of channels, shows, days and times are to restrict the child's ability to obtain information about or any ability to select any television content beyond that which is authorized by the parent. Thus, a parent may authorize the child-friendly guide application to return search results for specific shows, specific channels, specific times of the day and specific days of the week, or may request the child-friendly guide application to return search results for specific shows, specific channels, and specific genres etc.

Figure 3:
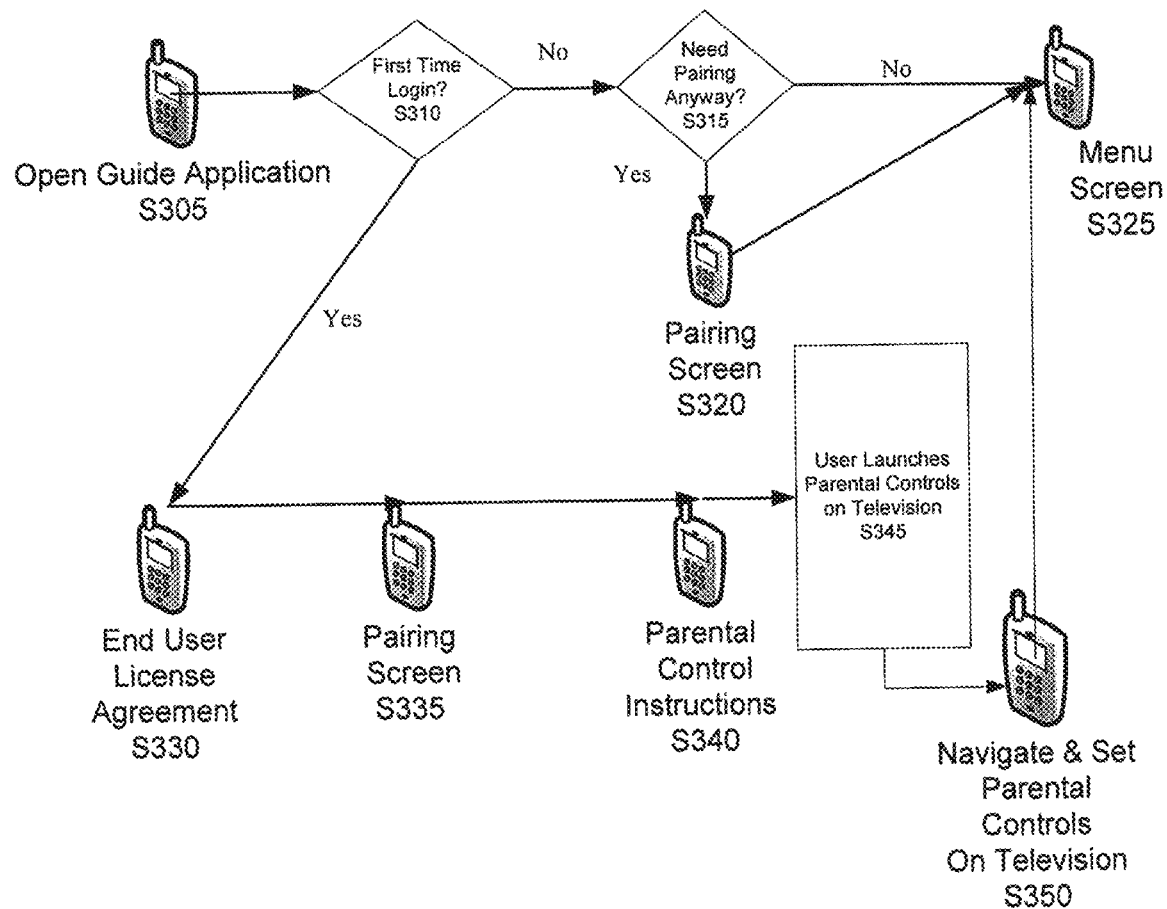
FIG. 3 shows another exemplary process for using a smart interactive media content guide, according to an aspect of the present disclosure.

FIG. 3 shows another exemplary process for using a smart interactive media content guide, according to an aspect of the present disclosure. In the process of FIG. 3, a guide application is opened on a user device at S305. At S310, a determination is made as to whether the user is logging in to the guide application for the first time. If the user is logging in for the first time (S310=Yes), the user is presented with an end user license agreement (EULA) at S330. Once the user agrees to the terns in the end user license agreement at S330, the user is provided an option at S335 to pair the user device and the guide application with a wireless-enabled smart television, wireless-enabled set-top box, wireless-enabled audio/visual receiver, or other wireless-enabled device used to control the display of content on the television. Once the user device is paired with the wireless-enabled device used to control the display at S335, the user is asked to input the parental control instructions at S340. At S345, the user launches the parental controls on the television. At S350, the user is asked to navigate through content and set parental controls on the television. At S325 the user is presented with a main menu screen.

If the user has already logged in before (S310=No), a determination is made at S315 as to whether the user device and wireless-enabled device used to control display have been paired already. If pairing is needed (S315=Yes), the user is provided with the same pairing screen at S320 as is otherwise provided at S335. After pairing the user device and wireless-enabled device used to control content at S320, the user is presented with the main menu screen at S325. If pairing is not needed (S315=No), the user is presented with the main menu screen at S325 without newly pairing the user device with the wireless-enabled device used to control display.

Figure 4:
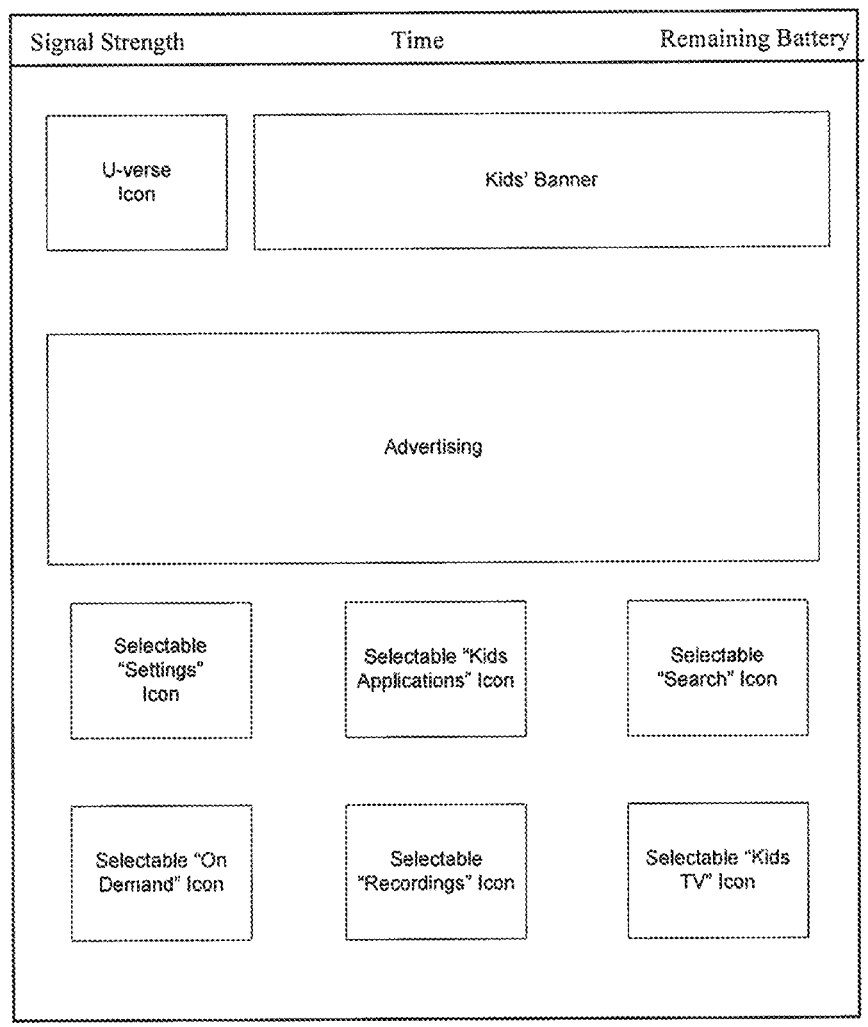
FIG. 4 shows an exemplary screenshot for a smart interactive media content guide, according to an aspect of the present disclosure.

FIG. 4 shows an exemplary screenshot for a smart interactive media content guide, according to an aspect of the present disclosure. In the screenshot of FIG. 4, a user using a user device is provided with choices on a main menu screen of a child-friendly guide application. The choices which can be selected by the user include selectable "settings", "kids applications", "search", "on demand", "recordings" and "kids TV".

The user interface shown in FIG. 4 and other drawings here may be tailored and configured specifically based in whole or in part on analysis of the voice and content of the user and search activity. Thus, the interface on the user device for the application may be automatically tailored by the application provider for each account, each user device, and/or each user. The interface may also be customizable by the users, such as when the users can select background designs from options provided by the service provider or application provider. In this way, age-appropriate content can be discovered with interface features such as colorful graphics and easy-to-use large buttons with clear icons. The application can therefore help children learn standard features such as icons and dedicated button symbols and terms that normally appear on remote controls provided by the service provider.

Each of the selectable options, once selected, leads to a different page with different options and/or content. For example, the "settings" icon, once pressed, may lead to a page listing one or more settings input by the user as described with respect to S240 to S265 in the embodiment of FIG. 2. The "kids applications" icon, once pressed, may lead to a page that shows icons for one or more additional applications authorized by the parent. The "search" icon, once pressed, may lead to a page that allows searches with pre-set search parameters authorized by the parent. The "on demand" icon, once pressed, may lead to a page that lists on-demand content authorized by the parent. The "recordings" icon, once pressed, may lead to a page that lists recorded content stored locally and authorized by the parent. The "kids TV" icon, once pressed, may lead to a page that lists content of any type (broadcast, on-demand, recorded) confirmed by the service provider to be appropriate for children, and also authorized by the parent.

As described, the various search icons in FIG. 3 may also, once pressed, allow the user to input speech as a search request for particular content. The search icons may be provided both with a distinct symbol and with descriptive wording to identify the intended function. Therefore, a television symbol may indicate that search terms expected once the icon is pressed should be terms for television content. A movie symbol may indicate that search terms expected once the icon is pressed should be for movie content. The child-friendly search application may also output an invitation for the user to speak. For example, a voice may ask "what would you like to watch" when an icon with a television or movie symbol is pressed. Thus, in addition to changing the page shown on the screen, pressing an icon on a page of the child-friendly search application may initiate a process for the user to input search terms as speech. Of course, as described herein, the output of the search is also provided as speech, for the benefit of users who, for example, are unable to read.

The smart interactive media content guide may also provide information such as advertising, helpful comment or guidance, or other types of information as background or in a window. Such a window is labeled "Advertising" in FIG. 4, and may contain a display such an image advertising a new movie that may be of interest to children. Information in such a window may be fixed for a time for all users who use the smart interactive media content guide. Alternatively, information in such a window may reflect content of interest to the main users of the smart interactive media content guide, or content authorized by the parents who set the settings of the smart interactive media content guide. That is, the entity that provides the smart interactive media content guide may study selections by users and parents, and tailor variable information in accordance with the selections. In this way, users may be informed of upcoming content releases that involve characters in shows they already watch, or on channels they already watch. Similarly, users may be provided with helpful tips or hints, or generally friendly and positive messages appropriate for children.

Figure 5:
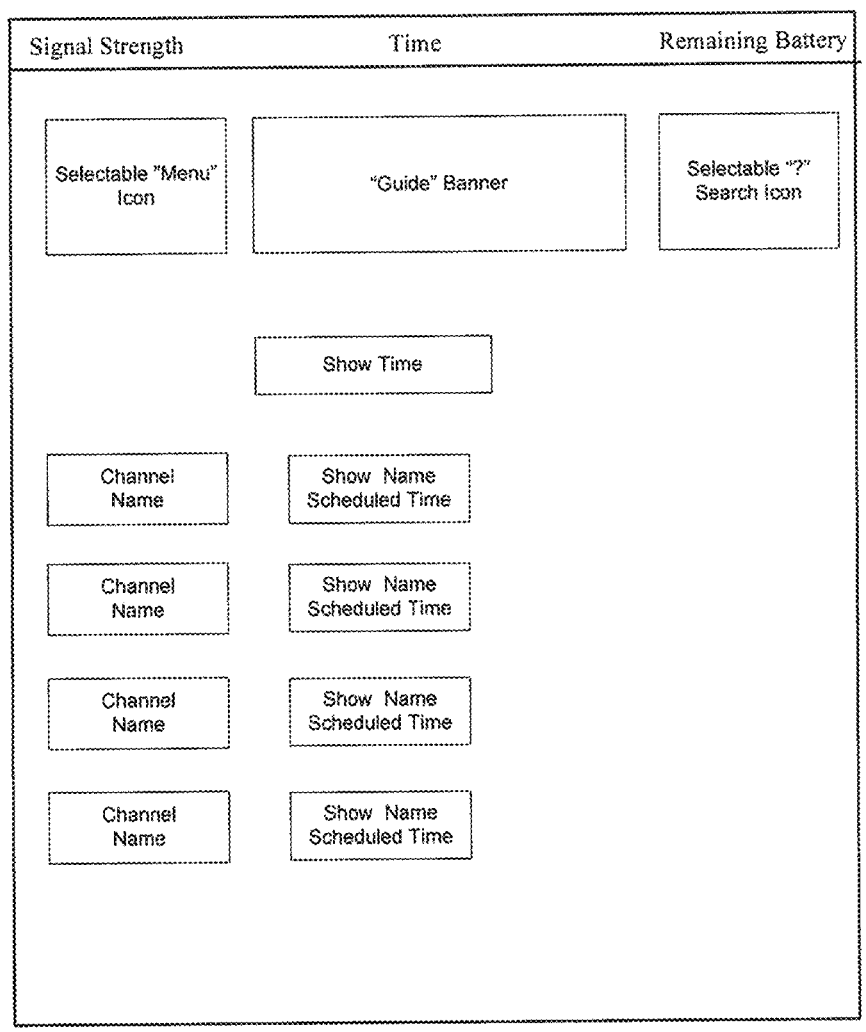
FIG. 5 shows another exemplary screenshot for a smart interactive media content guide, according to an aspect of the present disclosure.

FIG. 5 shows another exemplary screenshot for a smart interactive media content guide, according to an aspect of the present disclosure. In the screenshot in FIG. 5, a series of television content listings are provided by channel name, show name and scheduled time. Additionally, a selectable "MENU" icon is provided which, when pressed, will result in the viewer being presented with a main menu such as shown in FIG. 4. A selectable "search "icon" is also provided. When selected, the selectable "SEARCH" icon may allow the viewer to enter a free form search, or may present the viewer with preauthorized content for selection.

As shown in the screenshots herein including FIG. 5, child-friendly guide application can be built using universal design principles. The interfaces of the child-friendly guide application can be tailored for audience accessibility. Therefore, a tablet computer which is already familiar to a child can be used to provide the child with icons and images that help the child find media content to play.

Figure 6:
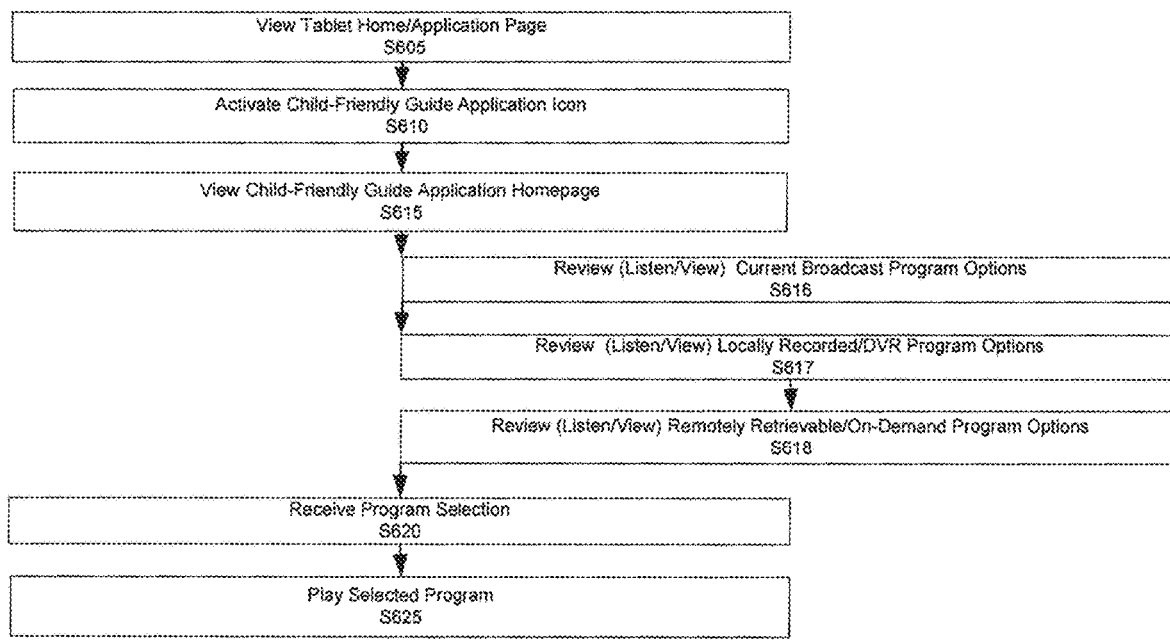
FIG. 6 shows another exemplary process for using a smart interactive media content guide, according to an aspect of the present disclosure.

FIG. 6 shows another exemplary process for using a smart interactive media content guide, according to an aspect of the present disclosure. In the process of FIG. 6, a user views a tablet home/application page at S605. At S610, the user activates a child friendly guide application by pressing an icon. At S615, the user views the child-friendly guide application homepage. At S616, the user reviews current broadcast program options. At S617, the user reviews locally recorded program options, such as content stored locally on a digital video recorder (DVR). At S618, the user reviews remotely retrievable on-demand program options. At any of S616, S617, S618, the output of content descriptions can be stopped by the user when, for example, the user makes a selection, motions in the air to "go back", or otherwise indicates no further interest in the search results being output any longer.

At S620, a program selection is received from the user. At S625, the selected program is played for the user. As described elsewhere herein, both the search terms and the program selection by a user can be associated with a profile of the user and/or the account, and then used later to tailor descriptions of content to play to the user. Further, search terms, program selections, and dates and times of searches may be stored for review later by parents interested in seeing what their children are most interested in viewing.

As also described herein, a search request may be analyzed to identify a demographic group of the user entering the search request. For example, voice or terms may be analyzed even only to identify or confirm that a user is likely a child, so as to ensure that inappropriate information is not returned based on the search. The categorization of a user into a likely demographic can be performed at a variety of different levels of granularity, such as an approximate age, an approximate gender, an estimated current location or origin of the user based on accent or terminology, or a simple determination that the user is merely most likely a child. As described, the search results may be tailored based on the identification of profile information of the user, including past searches for a particular user or account. Search results may also be tailored based on more general content information that is determined by the content provider to be popular generally with the same approximate demographic group as the user requesting the search.

In the example of FIG. 6, a child aged, for example, 5 to 12, can use a table computer at S605, open up the child-friendly guide application on the tablet computer at S610, view the homepage at S615, and then provide voice instructions to search for content to view. In this way, the child can simply speak a query, and then obtain search preapproved results from the service provider. The child can then hear at S616, S617 and S618, results of the search, including descriptions of broadcast listings, local content stored locally on a digital video recorder set-top box, or on-demand content that can be obtained from the service provider.

Further, the selection at S620, or a rearrangement/reordering of search results, may be provided as intuitive gestures "in the air". As previously described, the hand or other motions "in the air" may be captured in an image or series of images captured by a camera of the user device or another device, and based on the analysis used to either rearrange/reorder search results, or control a selection of content to be provided to the television from the set-top box.

In the embodiment of FIG. 6, results of a search are presented to a user. Search results may be filtered before being presented to a user, reordered/rearranged by or for the user, and/or presented to the user visually simultaneously with speech output. For example, search results can be filtered in accordance with predetermined instructions provided as settings by a user responsible for the account by which the television content is provided. As noted with respect to FIG. 2, settings may include filters such as allowed channels, shows and genres, as well as banned channels, shows and genres. Therefore, the filters in the present application allow a parent not only to ban a child from viewing particular content, but also allow the parent to ban descriptions of the content from even being presented to a child in the child-friendly guide application.

Filtered results may be filtered to show results only for authorized shows or channels or genres or characters, even when the search results returned in the network otherwise return many other items of content that are not shown to the user. Alternatively, the filters may be provided together with the search request terms as a modification of the search request, so as to modify the search request before a search algorithm searches for the items of content to return in response to the search request.

Additionally, the listings returned in response to the search request may be reordered/rearranged by the user. For example, the user device may include a touch screen that allows the user to swipe a finger to scroll results up or down on the touch screen. The user device may also have a camera that detects "in the air" motions by the user within the field of view of the camera. The "in the air" motions may be hand motions in the air and not in contact with any screen of the user device. The "in the air" motions may be interpreted by a processor that analyzes images captured by the camera, and interprets particular recognized images or series of images as an instruction to swipe the listings on the screen up or down or to the side. Additionally, a camera image or series of images may be interpreted as an instruction to move between pages, select a particular selectable item such as an item of content on a page, or to reorder the existing the results on the page in a different order than currently shown. An instruction to reorder search results may be an instruction to show results primarily in alphabetical order rather than channel order, or in genre order rather than in alphabetical order. The analysis of the images by a processor may be to sense relative movement of a user from one image to a later image. The relative movement of the user may be, for example, swiping motions of a finger, hand, or arm.

In an embodiment, the camera and processor that detect the "over the air" movement are not on the user device on which the application is installed. Instead, the camera that captures user motions "in the air" may be installed on the television, the set-top box or other service provider equipment, or on an audiovisual receiver. Additionally, a camera may be a stand-alone device. Whichever device has the camera may also have the processor that analyzes the user images to identify relative motions of the user "in the air". However, the processor that analyzes the images may also be on a different device, or within the network of the service provider. That is, images captured by a camera in proximity to the user may be forwarded to another device or even into the network of the service provider, analyzed by a processor at the destination, so that the analysis results are interpreted as interaction by the user with the application on the user device. The application reacts in response to the interpretation of the image analysis by, for example, reordering content, moving between pages displayed on the television and/or screen of the user device, or accepting an instruction as a selection of a particular selectable item such as an item of content to begin viewing. Thus, the user may motion "in the air" in proximity to a camera, and the motion may be used to input a selection, update or reorder results of a search request, or otherwise manipulate the application on the user device by for example moving between pages in the application. In this way, a child may be allowed to control a television with gestures, in some circumstances with virtually no understanding of how the system understands is capturing and understanding the child's gestures.

As described, results of a search request may also be presented to the user visually simultaneously with audible speech output. The results may be provided visually on the television screen and/or a screen of the user device on which the application is installed. The results may be provided audibly by speakers on the television, by a speaker on the user device on which the application is installed, and/or on other speakers interconnected with the television. In this way, a user may hear search results as they are being shown. Further, a particular item may be highlighted visually while being described audibly, in a way that helps a child learn to associate speech with words. In other words, the smart interactive media content guide can help a child learn to read by helping to show the child words being audibly spoken as they are being audibly spoken.

Figure 7:
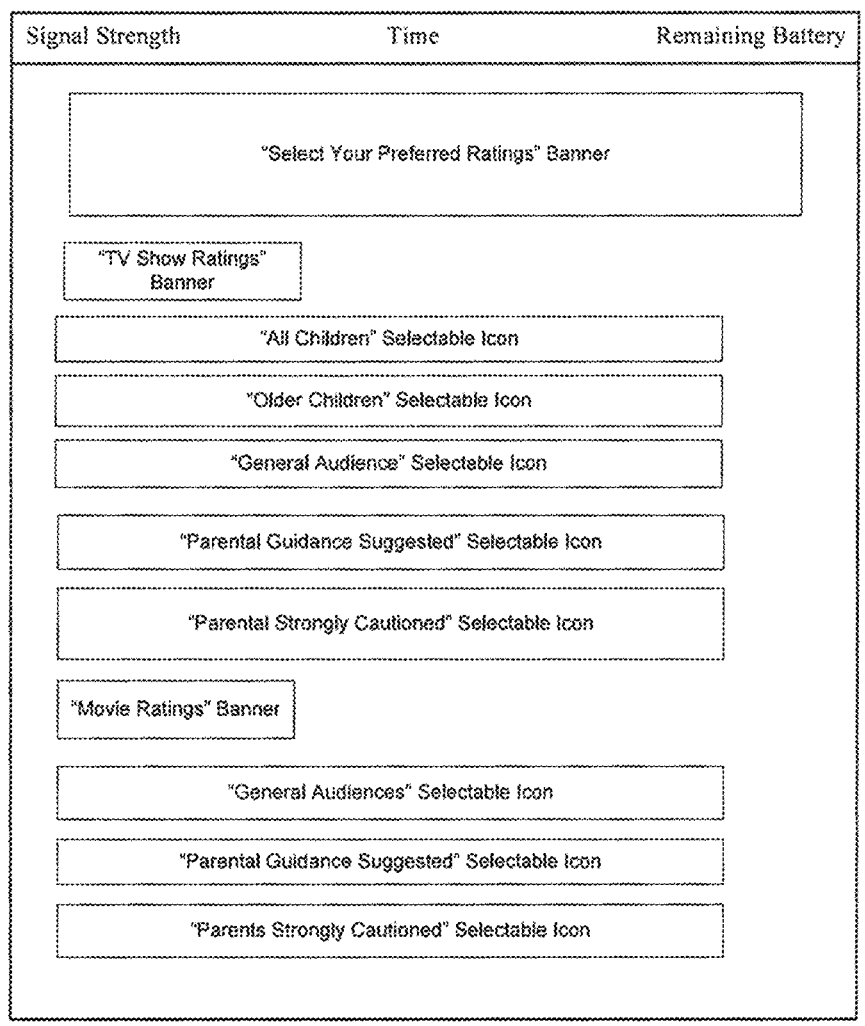
FIG. 7 shows another exemplary screenshot for a smart interactive media content guide, according to an aspect of the present disclosure.

FIG. 7 shows another exemplary screenshot for a smart interactive media content guide, according to an aspect of the present disclosure. In the embodiment of FIG. 7, the user is provided with selectable settings, including ratings preferences for predetermined categories of rated content. The user can enter ratings settings that must be met in order for users of the application to obtain content. For example, the network provider or smart interactive media content guide provider (if different than the network provider) may associate content with ratings such as "All Children" where the content is believed appropriate for all children. Similarly, ratings for "Older Children" may be provided for content that is believed inappropriate for younger children. "General Audience" may be provided for content believed appropriate for children and adults. "Parental Guidance Suggested" may be provided for content believed appropriate for children in the presence of a parent. "Parental Strongly Cautioned" may be provided for content strongly believed appropriate for children only in the presence of a parent. Similar ratings may be set for other types of content such as movies.

Figure 8:
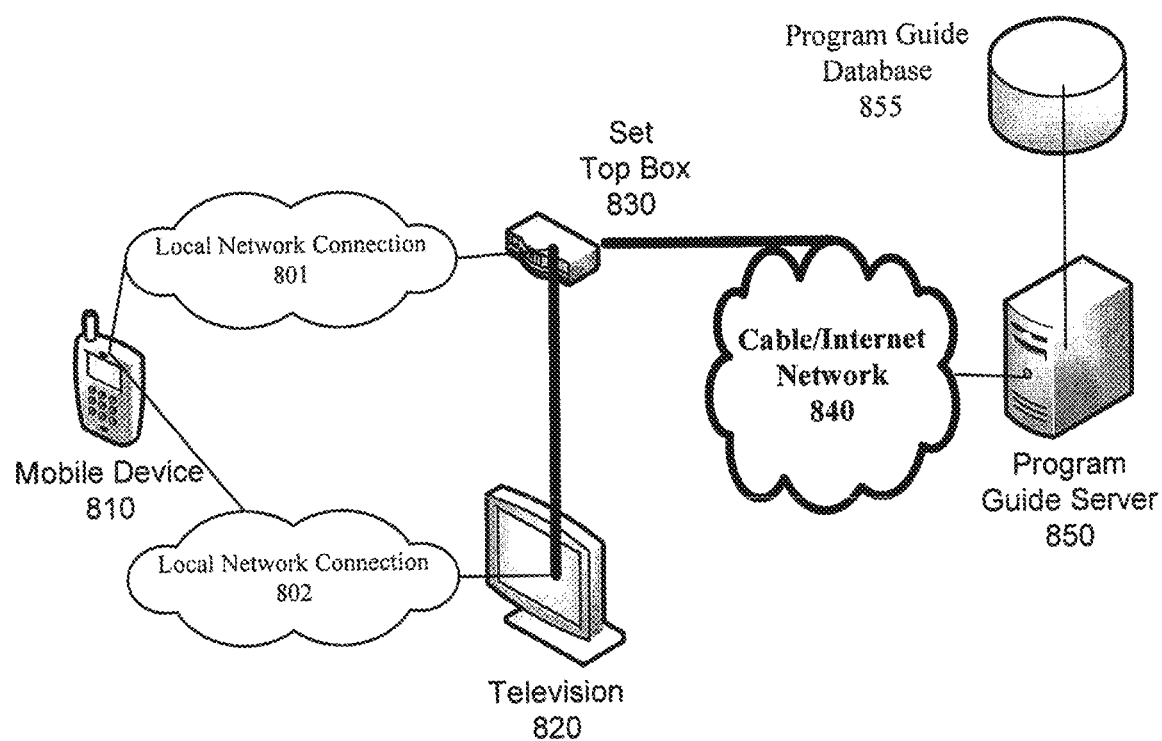
FIG. 8 shows an exemplary network in which a smart interactive media content guide is used, according to an aspect of the present disclosure.

FIG. 8 shows an exemplary network in which a smart interactive media content guide is used, according to an aspect of the present disclosure. In the network of FIG. 8, a user has a mobile device 810 such as a smart phone, tablet computer, or laptop computer. The mobile device 810 has the smart interactive media content guide installed therein, and allows the user to control content selections to be displayed on the television 820. The mobile device 810 may communicate via wireless fidelity or Bluetooth with the television 820 and or the set-top box 830. In turn, the set-top box communicates over a cable and/or internet network 840 with the service provider that provides the content. An exemplary device in the service provider network is the program guide server 850, by which information for listings, on-demand content and recorded content is stored in speech application database 855. The program guide server 850 stores in the speech application database 855, and retrieves information relating to the child-friendly guide application from speech application database 855.

As described herein, a child can speak a search query into a mobile device 810 on which the child-friendly guide application is running. The speech can be converted into text by the mobile device 810, the set-top box 830, or even a television 820 when the television is a smart television with a processor that executes instructions. However, when the service provider or application provider (if different than the service provider) has speech to text capabilities in a network beyond the local network where the television exists, the speech can be carried into the service provider network or otherwise into the internet, and converted to text in the service provider network or internet. In this way, speech can be sent to program guide server 850, converted to text, and used to search program guide database 855 for shows that match the requested search. The descriptions of the shows that match the query, their scheduled timing and other pertinent information will be sent back to the set top box 850 to be "read out" by the either the television 820 or by the mobile device 810. As described above, the results can be read out in a voice selected by the owner of the account by which television services are provided. As an example, search results can be read out using the Natural Voices text-to-speech conversion system implemented by AT&T Corporation. A number of voices from the AT&T Corporation library of text-to-speech voices can be made available for selection by the account owner, and then be used as the voice to read out descriptions of content to children using the child-friendly guide application. The voice offerings may include, for example, voices most likely to be found familiar or comfortable to a child, such as voices of famous children's characters, voices of other types of personalities familiar to children, or even voices of or similar to the voice of a parent of the child. Alternatively, the account owner may be able to select a gender for the voice, an accent for the voice, and an age of the speaker for the voice, without selecting the particular voice itself.

Speech may be provided from within the service provider network using the same television audio speech standards and formats used to provide television content. Such speech provided to the television and/or the user device to announce search results may conform with standards set by the Advanced Television Systems Committee Standards, such as Dolby Digital AC-3, also known as A/52. Such speech provided to the television and/or the user device may alternatively comply with standards set by the Motion Picture Expert Group, such as the Advanced Audio Coding (AAC) standard.

In the embodiment of FIG. 8, the set-top box is wired to communicate with the television 820. Therefore, the mobile device 810 may control the content for display by communicating with the set-top box 830. On the other hand, a mobile device 810 may communicate with the television 820 directly in order to interact with the smart interactive media content guide, such as when a set-top box 830 is not necessary.

In an embodiment such as in FIG. 8, a child may open and interact with a child-friendly guide application installed on a user device such as mobile device 810. The application may be configured to work with preexisting interactive voice input/output applications, such as VoiceOver from Apple and TalkBack from Google. In this way, the application can be used to provide enhanced services not just to children, but also other users such as blind and visually-impaired users.

In the example of FIG. 8, the mobile device 810 may be a general purpose user device purchased by the user independent of the television content, the television, and the set-top box. That is, the general purpose user device may be a smart phone, tablet or lap top bought for general purposes by or for the user. The general purpose user device may have many applications downloaded by or for the user from many different sources via one or more application stores or other application sources. Thus, the application and user device used to accept the search request may both be voluntarily obtained by the user separate and independent from obtaining the television content, the television, or any particular set top box. The user device may therefore not be a device-specific remote control provided only for controlling other devices, or a particular device such as an accompanying set-top box or television.

In an example, the mobile device 810 may be a smart phone used for wireless voice services, texting, and internet access using wireless networks provided by a wireless telephone company. Similarly, the mobile device 810 may be a tablet computer that accesses broadband internet services provided by a wireless telephone company. In each case, the smart phone or tablet computer is used both for communications services (e.g., voice, texting, internet) along with the child-friendly guide application described herein.

The system by which the child-friendly guide application is provided can also be preconfigured to output/present either a full description of a show, or less information. For example, information that describes selectable content responsive to a search request can be read out only by title and scheduled time, or some other combination of descriptors. Thus, the audible speech describing the listings responsive to a search request can be tailored by the voice used to read out the content, the types of descriptions of content, and the content itself which must meet the settings configured by the content owner.

Figure 9:
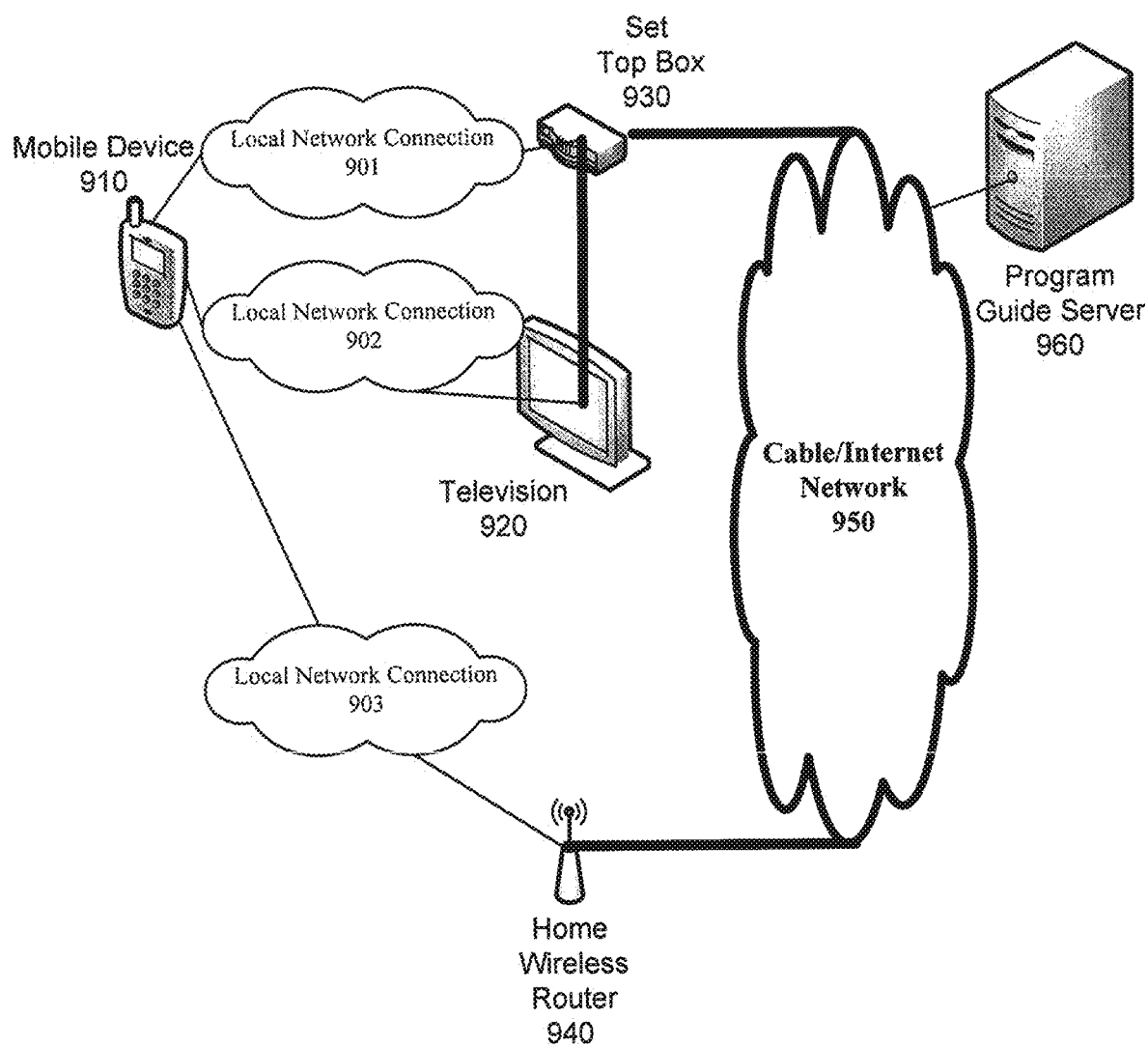
FIG. 9 shows another exemplary network in which a smart interactive media content guide is used, according to an aspect of the present disclosure.

FIG. 9 shows another exemplary network in which a smart interactive media content guide is used, according to an aspect of the present disclosure. In the embodiment of FIG. 9, a user with a mobile device 910 communicates over local network connections with set-top box 930, television 920 and home wireless router 950. The user may communicate via the home wireless router 940 in order to download the smart interactive media content guide. After pairing the mobile device 910 via the smart interactive media content guide, the user may then communicate directly with the set-top box 930 and/or television 920. The local network connections 901 and 902 may be wireless fidelity network connections, or may be Bluetooth or other forms of local wireless connections. In FIG. 9, both the set-top box 930 and the home wireless router 940 communicate with the service provider via the cable and/or internet network 950. As in the embodiment of FIG. 8, the service provider network includes program guide server 950, by which information for listings, on-demand content and recorded content is stored.

In the embodiment of FIG. 9, results of a search request can be ranked by the program guide server 960 in a variety of ways. For example, results of a search request can be ordered by a score of the likelihood of matching the search request. Alternatively, results of a search request can be ordered in channel and time order, by genre, and/or based on previous selections from the user specifically or from the account associated with the child-friendly guide application generally. The results can be read out from the television 920 or the mobile device 910 in order of best-fit to least-fit, based solely on likelihood of matching the search request, or otherwise reflecting other factors as described. A form of ranking the results must be provided so as to ensure that search results are presented in a logical and orderly manner.

As in other examples, a child can open the child-friendly guide application on mobile device 910, and then speak a search request into the mobile device 910. The results can then be read out by mobile device 910 or the television 920 and/or speakers interconnected with the television 920. In this way, processing of speech can be performed by the service provider network that provides the program guide server 960, and the results can be output as speech with minimal processing impositions on the mobile device 910 or television 920. In fact, the speech to be output can be provided from the program guide service 960 or otherwise by the service provider network in the same manner as speech which is played as television content on the television 920. Therefore, processing requirements for, e.g., speech recognition and conversion, and content searching can be predominantly absorbed by the service provider network.

Figure 10:
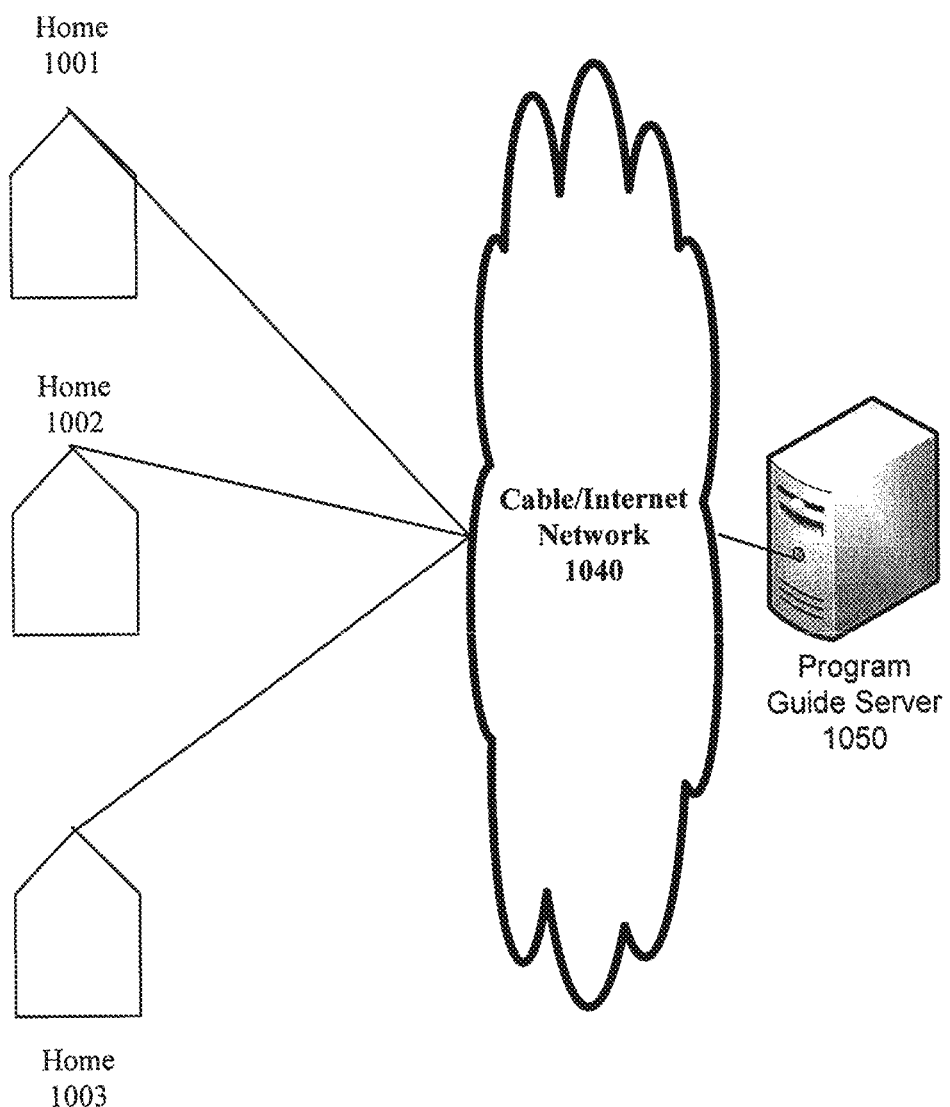
FIG. 10 shows another exemplary network in which a smart interactive media content guide is used, according to an aspect of the present disclosure.

FIG. 10 shows another exemplary network in which a smart interactive media content guide is used, according to an aspect of the present disclosure. In the embodiment of FIG. 10, the program guide server 1050 is shown to communicate over a cable and/or internet network 1040 with several homes 1001, 1002, 1003. In this way, FIG. 10 shows that the smart interactive media content guide may be provided to users in different homes associated with different accounts for services provided by the service provider.

Figure 11:
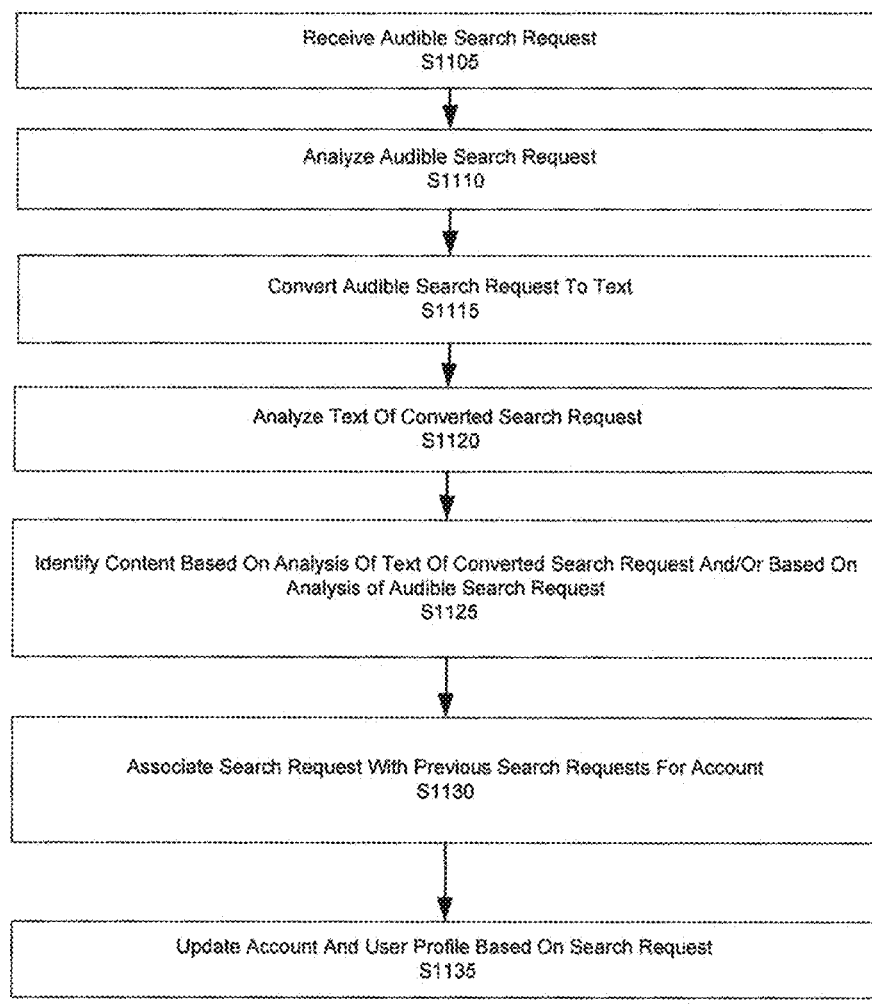
FIG. 11 shows an exemplary process for providing a smart interactive media content guide, according to an aspect of the present disclosure.

FIG. 11 shows an exemplary process for providing a smart interactive media content guide, according to an aspect of the present disclosure. In FIG. 11, an audible search request is received by the service provider at S1105, and analyzed at S1110 before being converted to text at S1115. As described above, the search request may be provided to a user device including a general purpose user device such as a smart phone or tablet computer. The search input can be sent by the child-friendly guide application from the user device to the television, to a set-top box, to an audiovisual receiver, or even to a wireless router. In any of these configurations, the search analysis may be initially performed by the (smart) television, the set-top box, the audiovisual receiver, or the wireless router. However, the search input can be passed through any of these devices to the content provider or application provider (if different than the content provider), and all analysis of the voice and search request may be performed in the network of the content provider.

The analysis at S1105 may be of the voice of the user inputting the search request and/or of the content of the search request itself. In this way, analysis of the voice may identify whether the voice is likely the voice of a child, and even an approximate age or age range of the user.

Additionally, the conversion of the speech to text may be performed on the user device or on a set-top box. However, the conversion may be provided within the network of the service provider using complex and advanced speech applications. For example, a spoken search request can be carried into the network of the service provider as data packets, and converted into text using automatic speech recognition powered by Watson Speech Recognition technology by AT&T Corporation. The analysis results in determinations of search terms to be used in identifying content for the user who inputs the audible search request to the user device on which the child-friendly guide application is installed. Thus, a speech-to-text server may be provided by or for the content provider that provides the television content. At noted above, any reference herein or in the figures to the child-friendly guide application is to the smart interactive media content guide application that is described herein At S1120, the text of the converted search request is analyzed. At S1125, content is identified based on an analysis of the text of the converted search request and/or based on analysis of the audible search request. At S1130, the search request is associated with previous search requests for the account. At S1135, the account and a user profile are updated based on the search request. As described herein, the child-friendly guide application may be recognize the user who enters search results, so as to help ensure that children are provided search results in accordance with previous settings by parents. Such recognition may be based on search terms, voice characteristics, or information volunteered by the user. Users may be categorized into approximate ages or age ranges, so that the child-friendly guide application understands who is using the application on the user device.

As described, the system can monitor usage of the child-friendly guide, and use usage information to update profiles and tailor content and information. However, the monitoring can also be used to provide a direct benefit to adults responsible for the account by which the television service is provided. In this way, a history of not only content that is played, but also search inquiries and search results and selection can be provided to the account owner upon request. Thus, the system described herein allows parents to monitor children's television search and viewing patterns. A report provided to an account owner may include times, dates, search terms, results, selections, and viewings.

The child-friendly guide application described herein may be an add-on to an existing remote control application provided already by a service provider so that television content can be controlled from a general-purpose user device. For instance, Easy Remote from AT&T Corporation can be used to complement the features of the child-friendly guide application described herein. The child-friendly guide application can leverage existing functionality for use by young television viewers, thereby making it possible for young television viewers to interact intuitively and easily with a television using speech input and output.

Although the smart interactive media content guide has been described with reference to several exemplary embodiments, it is understood that the words that have been used are words of description and illustration, rather than words of limitation. Changes may be made within the purview of the appended claims, as presently stated and as amended, without departing from the scope and spirit of the smart interactive media content guide in its aspects. Although the smart interactive media content guide has been described with reference to particular means, materials and embodiments, the smart interactive media content guide is not intended to be limited to the particulars disclosed; rather the smart interactive media content guide extends to all functionally equivalent structures, methods, and uses such as are within the scope of the appended claims.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for internet protocol, wireless fidelity and Bluetooth represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present application, television content is provided upon request. A search request for television content is received from a user on a user device. A plurality of listings for television content that meet the search request is determined based on the search request. Text describing the plurality of listings is converted to corresponding speech describing the plurality of listings. The speech describing the plurality of listings is audibly provided.

According to another aspect of the present disclosure, the user device is a mobile device on which an executable television content search application is running. The search request is input as speech to the mobile device. The search request is converted from speech to text before determining the plurality of listings based on the text.

According to yet another aspect of the present disclosure, the text of the search request is received at a system that controls display of television content on a television.

According to still another aspect of the present disclosure, the system includes the television.

According to another aspect of the present disclosure, the user device is a mobile device on which an executable television content search application is running. The speech describing the plurality of listings is audibly output by the mobile device.

According to yet another aspect of the present disclosure, the plurality of listings are a guide to broadcast television programs.

According to still another aspect of the present disclosure, the plurality of listings are a guide to television programs recorded on a digital video recorder.

According to another aspect of the present disclosure, the plurality of listings describe viewable video on demand content.

According to yet another aspect of the present disclosure, the method includes detecting movement of a user in proximity to a device that detects the movement. An arrangement of the plurality of listings is determined based on the movement of the user. The plurality of listings is arranged in accordance with the determining.

According to still another aspect of the present disclosure, the speech is transmitted from the mobile device into a network and translated into text in the network.

According to another aspect of the present disclosure, the method also includes determining, based on the search request, a demographic group of the user.

According to yet another aspect of the present disclosure, the plurality of listings describe television shows that match the search request and times at which the television shows are broadcast.

According to still another aspect of the present disclosure, the method further includes visually providing the text describing the plurality of listings to the user simultaneous with audibly providing the speech describing the plurality of listings to the user. The speech is provided to the user in a voice selected by an account owner responsible for an account by which the television content is provided.

According to another aspect of the present disclosure, the method also includes automatically identifying profile information of the user. The plurality of listings is further determined based on the profile information of the user.

According to yet another aspect of the present disclosure, the method includes filtering results of the search request in accordance with predetermined instructions from a user responsible for an account by which the television content is provided as a service.

According to still another aspect of the present disclosure, the method includes storing the search request and providing a record of the search request to a user responsible for an account by which the television content is provided as a service.

According to another aspect of the present disclosure, results of the search request are ranked using predetermined criteria.

According to yet another aspect of the present disclosure, an application used to accept the search request is downloaded to a user device from an online store. In this example, the user device is typically a general purpose user device. The general purpose user device is one purchased by the user independent of the television content, the television, and the set-top box. That is, the general purpose user device may be a smart phone, tablet or lap top bought for general purposes by or for the user. The general purpose user device may have many applications downloaded by or for the user from many different sources via one or more application stores or other application sources. Thus, the application and user device used to accept the search request may both be voluntarily obtained by the user separate and independent from obtaining the television content, the television, or any particular set top box. The user device may therefore not be a device-specific remote control provided only for controlling other devices, or a particular device such as an accompanying set-top box or television.

According to an aspect of the present application, a tangible computer readable storage medium stores a computer program for providing television content upon request. The computer program is executed by a processor. The computer program causes a computer apparatus to perform a process. In the process, a search request for television content is received from a user on a user device. A plurality of listings for television content that meet the search request is determined based on the search request. Text describing the plurality of listings is converted to corresponding speech describing the plurality of listings. The speech describing the plurality of listings is audibly provided.

According to an aspect of the present application a computer apparatus includes a memory that stores instructions for providing television content upon request, and a processor that executes the instructions. When executed by the processor, the instructions cause the processor to perform operations. In the operations, a search request for television content is received from a user on a user device. A plurality of listings for television content that meet the search request is determined based on the search request. Text describing the plurality of listings is converted to corresponding speech describing the plurality of listings. The speech describing the plurality of listings is audibly provided.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing content upon request, the method comprising:
   receiving, by a processing system including a processor and from equipment of a first user, a configuration for a media content guide application, the media content guide application being configured for use by a second user based on the configuration, the second user being different than the first user, the media content guide application being configured to specify summary descriptions of items of media content to not be provided responsive to search requests and summary descriptions of items of media content to be provided responsive to the search requests;
   receiving, by the processing system and via the media content guide application, a particular search request for requested summary descriptions of items of media content;
   analyzing, by the processing system, the particular search request to identify a demographic group of a user entering the particular search request, the second user being included in the demographic group;
   applying, by the processing system and in response to the analyzing and based on the configuration for the media content guide application, a first filter to the particular search request to modify the particular search request before a search algorithm searches for the requested summary description of items of media content to return in response to the particular search request, wherein the first filter is based on the configuration for the media content guide application received from the equipment of the first user;
   determining, by the processing system and based on the particular search request to which the first filter is applied, permissible summary descriptions of items of media content from the requested summary descriptions of items of media content to be provided, while preventing impermissible summary descriptions of items of media content not to be provided;
   obtaining, by the processing system, search results according to the first filter; providing, by the processing system, the search results to the media content guide application, the search results presented as selectable search results of the media content guide application;
   receiving, by the processing system, a selection of a selected media content item from among the selectable search results of the media content guide application;
   recognizing, by the processing system and from the particular search request, an identity of the second user to ensure a second filter is applied to the selected media content item based on a configuration of an account, wherein the recognizing is based on one or more of a voice recognition of the second user as recognized by an automatic voice recognition system, a voice characterization of the second user, search terms used by the second user, content accessed by the second user, or search activity of the second user; and
   applying, by the processing system, the second filter to the selected media content item responsive to the selection, wherein presentation of the selected media content item to the second user is only permissible according to the second filter, wherein the summary descriptions of items of media content are filtered separately from the items of media content.

2. The method according to claim 1, wherein the account is associated with the second user.

3. The method according to claim 2, further comprising:
   associating, by the processing system, the particular search request with previous search requests for the account.

4. The method according to claim 3, wherein the second user is recognized as a child.

5. The method according to claim 3, wherein the particular search request is received via the media content guide application executing on a user device.

6. The method according to claim 3, wherein the particular search request is received via the media content guide application executing on a user device, and the media content guide application includes graphics of symbols and terms that are on remote controls provided by a service provider.

7. The method according to claim 2, wherein the summary descriptions of items of media content to not be provided includes summary descriptions of shows, channels, and genres that the first user does not want returned as the selectable search results and the summary descriptions of items of media content to be provided includes summary descriptions of shows, channels, and genres that the first user does want returned as the selectable search results.

8. The method according to claim 1, wherein the particular search request is received via the media content guide application executing on a user device, the selectable search results are provided visually on a screen of the user device, and the method further comprises:
   highlighting, by the processing system, a particular item of the selectable search results on the screen of the user device while audibly describing the particular item by the user device.

9. The method according to claim 1, wherein the particular search request is received via the media content guide application executing on a user device, the selectable search results are provided visually on a screen of the user device, and the method further comprises:
   detecting, by the processing system, movement in proximity to the user device;
   determining, by the processing system and based on the movement, a rearrangement of the selectable search results; and
   rearranging, by the processing system, the selectable search results on the screen of the user device in accordance with the determining.

10. The method according to claim 1, wherein the applying of the first filter to the particular search request filters the summary descriptions of items of media content separately from the items of media content, wherein the particular search request is received via the media content guide application executing on a user device, the particular search request includes a spoken query, and the selectable search results are audibly provided via the user device.

11. The method according to claim 1, wherein the particular search request is received via the media content guide application executing on a user device, the media content guide application includes pre-set search parameters authorized by the first user, and the particular search request is received in accordance with the pre-set search parameters.

12. The method according to claim 1, further comprising:
storing, as part of a profile of the second user, the search requests and content selections by the second user over time;
recognizing patterns of both the search requests and content selections by the second user; and
using the patterns to tailor the search results provided to the media content guide application.

13. The method according to claim 1, wherein the media content guide application works separately from the second filter.

14. The method of claim 1, further comprises:
applying, by the processing system, artificial intelligence to the search request, wherein the recognizing the identity of the second user is according to the artificial intelligence.

15. A computer apparatus, comprising:
a processing system including a processor; and
a memory that stores executable instructions that, when executed by the processing system facilitate performance of operations, the operations comprising:
receiving, from equipment of a first user, a configuration for a content guide application, the content guide application being configured for use by a second user based on the configuration, the second user being different than the first user, the content guide application being configured to specify summary descriptions of items of content to not be provided and summary descriptions of items of content to be provided;
receiving, via the content guide application, a search request for requested summary descriptions of items of content;
analyzing the search request to identify a demographic group of a user entering the search request, the second user being included in the demographic group;
applying, in response to the analyzing and based on the configuration for the content guide application, a first filter to the search request to modify the search request before a search algorithm searches for the requested summary descriptions of items of content to return in response to the search request, wherein the first filter is based on the configuration for the content guide application received from the equipment of the first user;
determining, based on the search request to which the first filter is applied, permissible summary descriptions of items of content from the requested summary descriptions of items of content to be provided, while preventing impermissible summary descriptions of items of content to not be provided;
obtaining search results according to the first filter; providing the search results to the content guide application, the search results presented as selectable search results of the content guide application;
identifying a selection of a selected item of content from among the selectable search results of the content guide application;
recognizing, from the search request, an identity of the second user to ensure a second filter is applied to the selected item of content based on a configuration of an account, wherein the recognizing is based on one or more of a voice recognition of the second user as recognized by an automatic voice recognition system, a voice characterization of the second user, terms used by the second user, content accessed by the second user, or search activity of the second user; and
applying, responsive to the selection, the second filter, wherein presentation of the selected item of content to the second user may be allowed or banned according to the second filter, wherein the summary descriptions of items of media content are filtered separately from the items of media content.

16. The computer apparatus according to claim 15, wherein the account is associated with the second user.

17. The computer apparatus according to claim 15, wherein the content guide application works separately from the second filter.

18. A non-transitory, machine-readable medium comprising executable instructions that, when executed by a processing system including a processor, facilitate performance of operations, the operations comprising:
receiving, from equipment of a first user, a configuration for a content guide application, the content guide application being configured for use by a second user, the second user being different than the first user, the content guide application being configured to specify summary descriptions of items of content to not be provided and summary descriptions of items of content to be provided;
receiving, via the content guide application, a search request for requested summary descriptions of items of content;
analyzing the search request to identify a demographic group of a user entering the search request, the second user being included in the demographic group;
applying, in response to the analyzing and based on the configuration for the content guide application, a first filter to the search request to modify the search request before a search algorithm searches for the requested summary descriptions of items of content to return in response to the search request, wherein the first filter is based on the configuration for the content guide application received from the equipment of the first user;
determining, based on the search request to which the first filter is applied, permissible summary descriptions of items of content from the requested summary descriptions of items of content to be provided, while preventing impermissible summary descriptions of items of content to not be provided;
obtaining search results according to the first filter; providing the search results to the content guide application, the search results presented as selectable search results of the content guide application;
identifying a selection of a selected content item from among the selectable search results of the content guide application; and
recognizing, from the search request, the second user to ensure a second filter is applied to the selected content item based on a configuration of an account, wherein the recognizing is based on one or more of a voice recognition of the second user as recognized by an automatic voice recognition system, a voice characterization of the second user, terms used by the second user, content accessed by the second user, or search activity of the second user; and applying, responsive to the selection, the second filter, wherein presentation of the selected content to the second user may be allowed or banned according to the second filter, wherein the summary descriptions of items of media content are filtered separately from the items of media content.

19. The non-transitory, machine-readable medium according to claim 18, wherein the account is associated with the second user.

20. The non-transitory, machine-readable medium according to claim 18, wherein the content guide application works separately from the second filter, and wherein the items of content comprise advertisements.

\* \* \* \* \*